United States Patent [19]

Ross et al.

[11] Patent Number: 4,645,032
[45] Date of Patent: Feb. 24, 1987

[54] COMPACT MUFFLER APPARATUS AND ASSOCIATED METHODS

[75] Inventors: David F. Ross, Scottsdale; Craig A. Lyon, Mesa, both of Ariz.

[73] Assignee: The Garrett Corporation, Los Angeles, Calif.

[21] Appl. No.: 772,831

[22] Filed: Sep. 5, 1985

[51] Int. Cl.$^4$ ............................................. F01N 1/02
[52] U.S. Cl. .................................... 181/250; 181/224; 181/272; 181/273
[58] Field of Search ............... 181/213, 214, 224, 222, 181/286, 288, 292, 264, 250, 273, 272

[56] References Cited

U.S. PATENT DOCUMENTS

| | | | |
|---|---|---|---|
| Re. 31,275 | 6/1983 | Wirt | 181/224 |
| 2,051,515 | 8/1936 | Bourne . | |
| 2,326,612 | 8/1943 | Bourne . | |
| 2,989,136 | 6/1961 | Wohlberg | 181/224 |
| 3,113,634 | 12/1963 | Watters | 181/224 |
| 3,113,635 | 12/1963 | Allen et al. . | |
| 3,511,336 | 5/1970 | Rink et al. | 181/224 |
| 3,580,357 | 5/1971 | Whitney . | |
| 4,091,892 | 5/1978 | Hehmann et al. | 181/286 |
| 4,106,587 | 8/1978 | Nash et al. | 181/213 |
| 4,128,769 | 12/1978 | Bons et al. | 181/264 X |
| 4,296,831 | 10/1981 | Bennett | 181/224 |
| 4,298,090 | 11/1981 | Chapman | 181/286 |
| 4,327,816 | 5/1982 | Bennett | 181/292 |
| 4,336,863 | 6/1982 | Satomi | 181/224 |
| 4,346,781 | 8/1982 | Ingard et al. | 181/224 X |
| 4,371,054 | 2/1983 | Wirt | 181/273 X |
| 4,378,859 | 4/1983 | Satomi et al. | 181/224 |
| 4,384,634 | 5/1983 | Shuttleworth et al. | 181/213 |

*Primary Examiner*—Benjamin R. Fuller
*Attorney, Agent, or Firm*—J. Richard Konneker; James W. McFarland; Albert J. Miller

[57] ABSTRACT

An axially asymmetric exhaust gas muffler has a perforated central exhaust duct that is circumscribed by a duality of reactive sound attenuating chambers in each of which is positioned a resonant sound attenuator.

11 Claims, 6 Drawing Figures

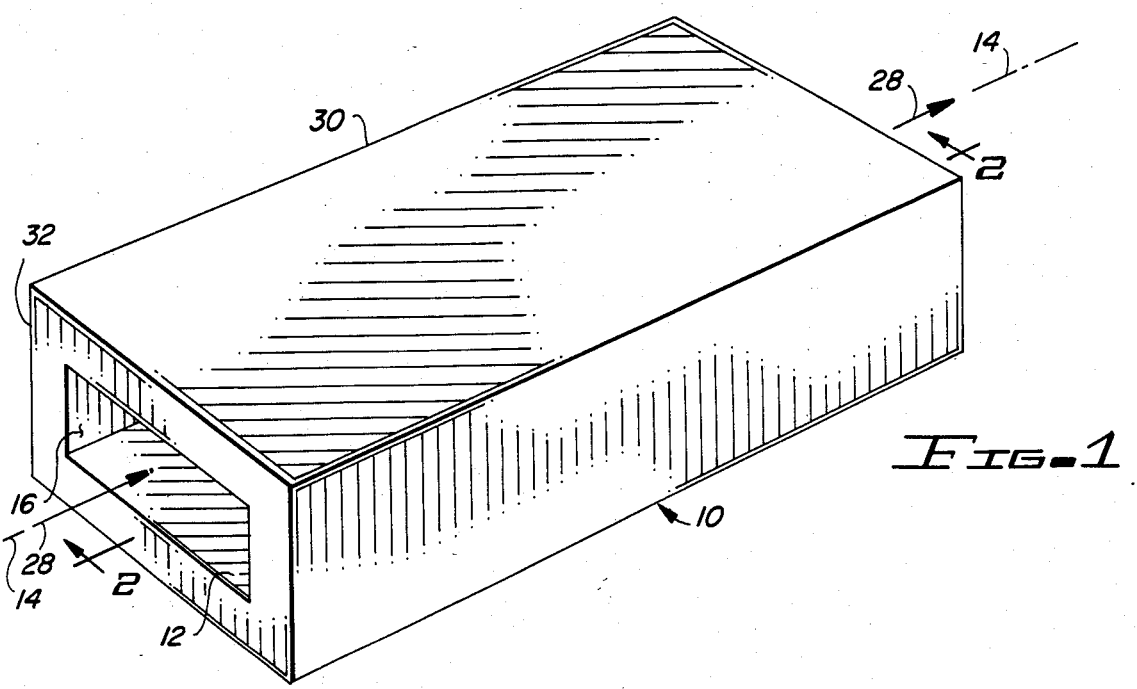
Fig-1
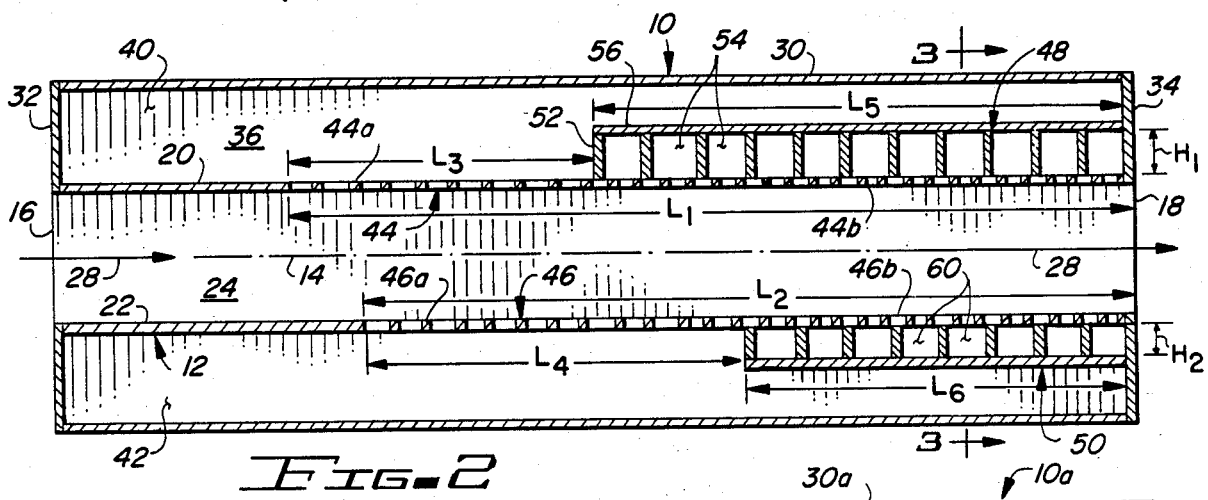
Fig-2
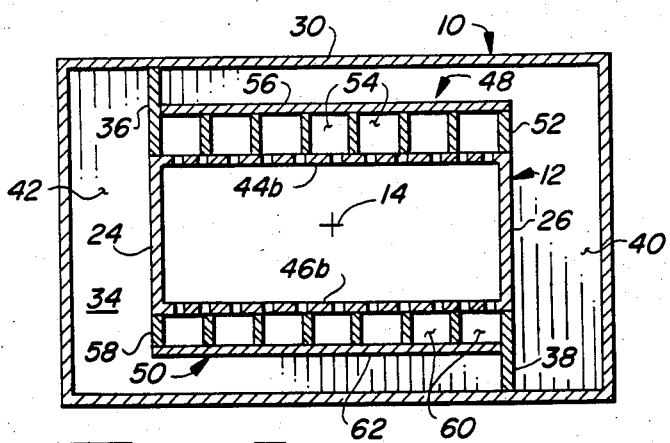
Fig-3
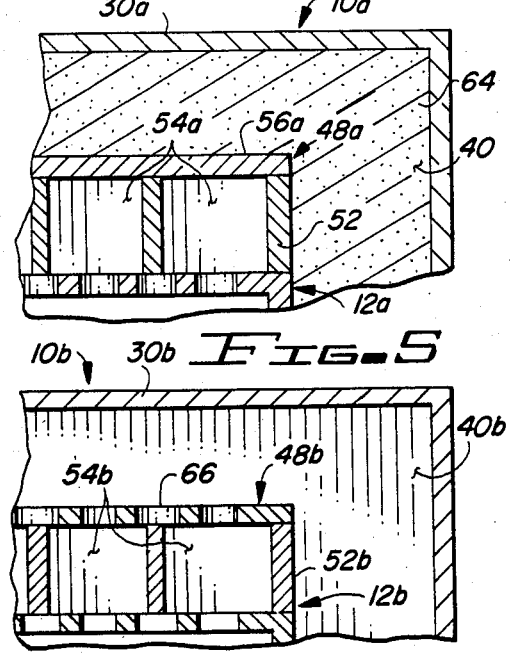
Fig-5
Fig-6

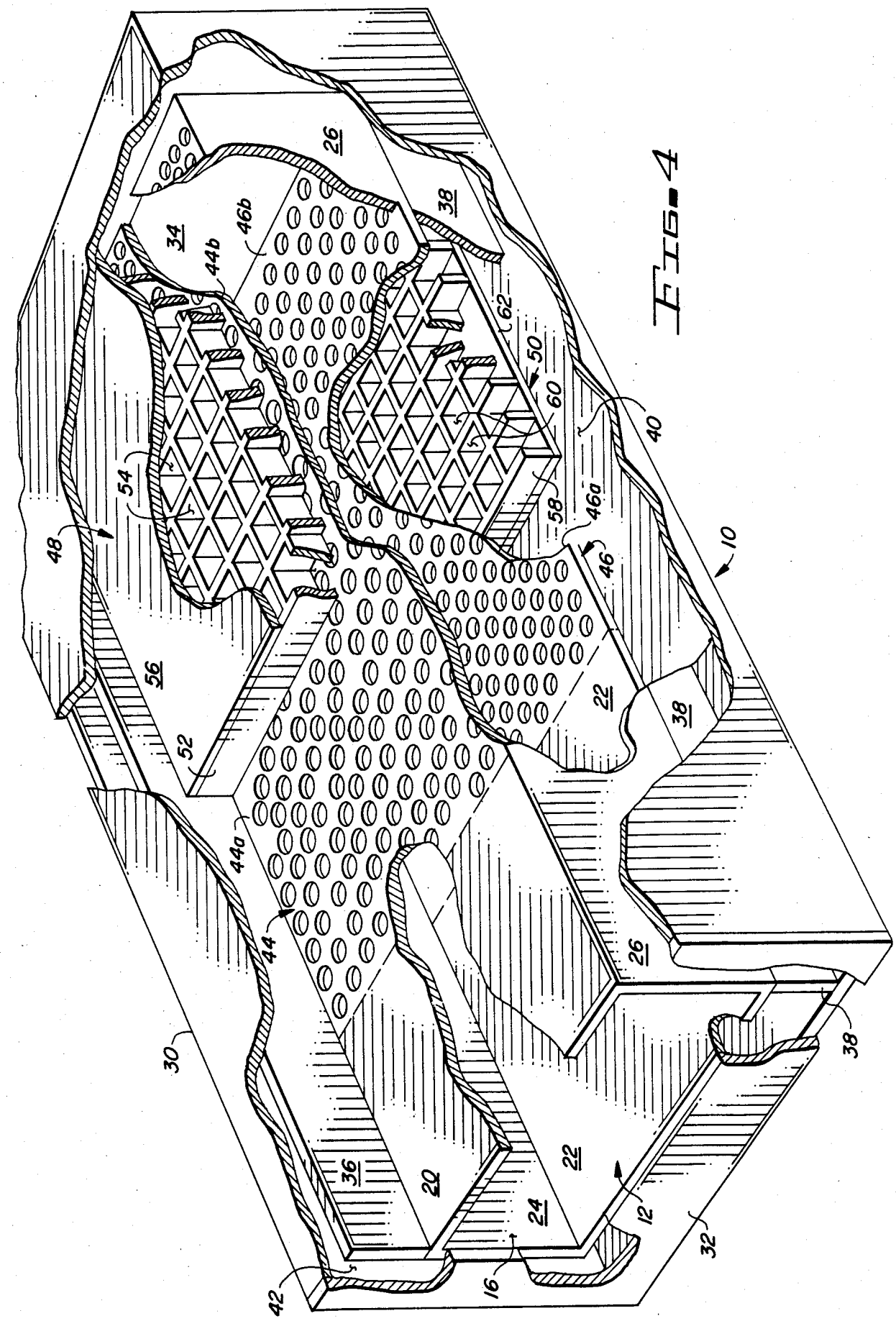

COMPACT MUFFLER APPARATUS AND ASSOCIATED METHODS

BACKGROUND OF THE INVENTION

The present invention relates generally to engine exhaust gas mufflers, and more particularly provides a uniquely configured exhaust gas muffler, and associated sound attenuating methods, for effectively attenuating both core and turbine noise generated by a gas turbine engine.

In many gas turbine engine applications, particularly those in which the engine is used in conjunction with a ground vehicle or in a stationary ground installation, effective attenuation of the engine's exhaust noise becomes highly important. In general, to satisfactorily diminish a turbine engine's exhaust noise, both its core and turbine noise must be attenuated. Core noise is a low frequency noise component believed to be at least partly caused by the combustion processes within the engine, while turbine noise is a high frequency noise component caused by the interaction of high velocity gasses with the engine's turbine section or sections. The frequency spectrum of core noise is essentially broadband, peaking at a relatively low frequency around 200 to 800 HZ where most of the energy of such core noise is concentrated. Turbine noise, on the other hand, is a significantly higher frequency noise phenomenon, having both broadband and discrete spectral components, peaking at a relatively high frequency around 6,000 to 10,000 HZ.

To effect a satisfactory degree of silencing of both of these exhaust noise components, conventional exhaust gas mufflers for turbine engines have been constructed with various sound attenuating devices placed end-to-end along the flow axis of the muffler, each such device being designed to attenuate engine exhaust noise across a different frequency band. Because of this conventional necessity of arranging different attenuating devices in such end-to-end relationship, conventional gas turbine engine exhaust mufflers have evolved into relatively large and bulky structures - sometimes approaching the overall size of the engines whose exhaust noise they are designed to attenuate.

Accordingly, it is an object of the present invention to provide a turbine engine exhaust gas muffler which will function to effectively attenuate both core and turbine noise, yet be considerably more compact than conventional mufflers.

SUMMARY OF THE INVENTION

The present invention provides a compact muffler which functions to effectively attenuate both the core and turbine noise components of a gas turbine engine. The muffler comprises wall means which define a flow passage adapted to receive and discharge engine exhaust gas. Circumscribing at least a portion of the flow passage are first sound attenuating means which function to reactively attenuate, across a relatively low frequency band characteristic of core noise, noise within the flow passage. Positioned within the first sound attenuating means are second sound attenuating means which function to resonantly attenuate, across a relatively high frequency band characteristic of turbine noise, additional noise within the flow passage.

Because the resonant sound attenuating means are uniquely positioned within the reactive sound attenuating means, the overall size of the muffler, particularly its length, is considerably reduced compared to conventional mufflers in which the various sound attenuating structures are positioned in an end-to-end relationship.

In a preferred embodiment of the invention, the wall means comprise a duct having a rectangular cross-section and a pair of opposite side walls each having a perforated section formed therein. The first sound attenuating means include a duality of chambers each enveloping a different one of the opposite side walls and communicating with the flow passage through first portions of their perforated sections. The second sound attenuating means comprise a duality of latticed wall resonant sound attenuating structures, each extending along and covering a second portion of one of the perforated side wall sections.

The first portions of the perforated side wall sections are of different sizes, as are the two latticed wall structures. Accordingly, the chambers function to reactively attenuate sound within the flow passage across two different, relatively low frequency bands, while the latticed wall structures resonantly attenuate sound within the flow passage across two different, relatively high frequency bands.

BRIEF DESCRIPTION OF THE DRAWINGS

FIG. 1 is a perspective view of a compact muffler embodying principles of the present invention;

FIG. 2 is an enlarged cross-sectional view taken through the muffler along line 2—2 of FIG. 1;

FIG. 3 is a cross-sectional view through the muffler taken along line 3—3 of FIG. 2;

FIG. 4 is an enlarged scale sectioned view of the muffler as depicted in FIG. 1;

FIG. 5 is an enlargement of an upper righthand corner portion of FIG. 3 and illustrates an alternate embodiment of the muffler; and FIG. 6 is an enlargement of an upper righthand corner portion of FIG. 3, and illustrates a further alternate embodiment of the muffler.

DETAILED DESCRIPTION

Illustrated in FIGS. 1-4 is a compact exhaust gas muffler 10 which embodies principles of the present invention and is utilized to effectively attenuate both the core and turbine noise components of a gas turbine engine (not shown). The muffler 10 includes an open-ended duct 12 which circumscribes a flow axis 14 and has a rectangular cross-section. Duct 12 has an inlet 16, an outlet 18, a pair of opposite upper and lower side walls 20 and 22, a pair of opposite side walls 24 and 26, and defines a flow passage adapted to receive and discharge exhaust gas 28 expelled from the turbine engine.

Enveloping the duct 12 in an outwardly spaced relationship therewith is an outer wall or housing 30 which has a rectangular cross-section, a laterally inwardly extending upstream end wall 32 which circumscribes the duct inlet 16, and a laterally inwardly extending downstream end wall 34 which circumscribes the duct outlet 18. As used herein, the terms "lateral" or "laterally" refer to directions perpendicular to the flow axis 14, while the terms "axial" or "axially" refer to a direction parallel to such axis.

The rectangular duct 12 is supported coaxially within the housing 30 by a pair of baffle members 36,38 each of which extends axially within the housing 30 between its opposite end walls 32,34. As can best be seen in FIGS. 3 and 4, baffle 36 extends between and intersecures an upper left corner portion of the duct 12 and the upper wall of the housing 30, while the baffle 38 extends between and intersecures a lower right corner portion of the duct 12 and the lower side wall of the housing 30. In addition to their duct-supporting function, the baffles 36,38 also serve to divide the space between the housing 30 and the duct 12 into two axially extending chambers 40 and 42. Each of the chambers 40,42 has, along its length, an L-shaped cross-section, chamber 40 extending generally along the duct side walls 20 and 26, and chamber 42 extending generally along the duct side walls 22 and 24. If desired, the baffle members 36,38 could be oriented differently relative to the duct 12 to define two "laterally bent" chambers. For example, such baffles could extend from central portions of duct side walls 24 and 26, thereby defining two generally U-shaped chambers instead of the L-shaped chambers illustrated.

The upper and lower duct side walls 20,22 have respectively formed therein, across their entire widths, perforated sections 44 and 46. Perforated section 44, as viewed in FIG. 2, extends leftwardly a distance $L_1$ from the downstream housing end wall 34, while the perforated section 46 extends leftwardly from end wall 34 a shorter distance $L_2$. The duct 12 is preferably made of sheet metal, with the perforated sections therein being formed simply by forming perforations in the designated side walls of the duct. However, if desired, such perforated sections could be separate perforated sheets of other suitable sound attenuating material.

The chamber 40 communicates with the interior of duct 12 through a left end portion $44_a$ of the perforated section 44, portion $44_a$ having an axial length $L_3$. In a similar manner, the chamber 42 communicates with the duct interior through a left end portion $46_a$ of perforated section 46, portion $46_a$ having a longer axial length $L_4$. As will be seen, the chambers 40 and 42 function as sound attenuating chambers for reactively attenuating, across two relatively low frequency bands, sound associated with exhaust gas flow through the duct 12.

The term "reactive", in the sound attenuation context used herein, means that the sound attenuation characteristics of the particular attenuator (i.e., the chamber 40 or 42) arise from, and are primarily affected by, its overall volume and configuration. Stated otherwise, the attenuation characteristics of a reactive attenuator are dimension-dominated. The term "resonant", on the other hand, means that the sound attenuation characteristics of the particular attenuator are, as to sound inflow thereto, resistance-dominated.

Positioned respectively within the chambers 40,42, in a "laterally stacked" relationship therewith and covering second portions $44_b$ and $46_b$ of the perforated duct wall sections 44,46 are two resonant sound attenuators 48 and 50. Attenuator 48 includes a latticed wall structure 52 which extends axially a distance $L_5$ within chamber 40 and covers the entire second perforated duct portion $44_b$ (i.e., the balance of perforated section 44), the structure 52 having a lateral height $H_1$. The intersecting walls of the wall structure 52 function as baffles which define a series of sound attenuating cells 54 which extend laterally outwardly from the perforated duct portion $44_b$ and are covered at their upper ends by a solid wall 56.

Attenuator 50, positioned in chamber 42 and covering perforated duct portion $46_b$ (i.e., the balance of perforated section 46), is similar in construction to attenuator 48 but has a shorter axial length $L_6$ and a lesser lateral height $H_2$. Like the larger attenuator 48, attenuator 50 includes a latticed wall structure 58 which defines a series of sound attenuating cells 60 that extend laterally outwardly from the perforated duct portion $46_b$ and are covered at their lower, or laterally outer, ends by a solid wall 62.

While the cells 54,60 are illustrated as having a rectangular cross-section, a variety of other cross-sectional configurations could be employed. As but one example, an hexagonal "honeycomb" cell structure could also be used.

Because of the length differential between the perforated duct portions $44_a$ and $46_a$, and the length and height differential between the resonant sound attenuators 48 and 50, the muffler 10 is of an axially asymmetric configuration, as can best be seen in FIGS. 2 and 4. More specifically, each of the four compactly arranged sound attenuating means (i.e., the two reactive sound attenuating chambers 40 and 42, and the two resonant sound attenuators 48 and 50) has a different overall configuration than the other three sound attenuating means. As will now be described, this asymmetry affords the muffler 10 the capability of attenuating engine noise across four different frequency bands.

As engine exhaust gas 28 is flowed through the duct 12, sound is transmitted into chamber 40 through the perforated duct portion $44_a$, and into chamber 42 through the somewhat larger perforated duct portion $46_a$. Chamber 42 has a slightly larger effective volume than chamber 40 due to the fact that the overall volume of the resonant attenuator 48 is larger than the overall volume of the resonant attenuator 50. This inlet area and volumetric differential between the chambers 40 and 42 creates a concomitant "tuning" differential therebetween. Accordingly, each of the chambers reactively attenuates relatively low frequency sound (characteristic of "core" noise in the turbine engine) across a different frequency band.

In a similar manner, sound is respectively transmitted into the cells 54,60 of the resonant attenuators 48,50 through the perforated duct portion $44_b$ and the smaller perforated duct portion $46_b$. The attenuators 48,50 accordingly resonantly attenuate relatively high frequency sound (characteristic of the engine's "turbine" noise) across two different frequency bands.

It can be seen that in addition to its unique compactness, the muffler 10 offers a wide range of design flexibility as to the actual four frequency bands that it will effectively attenuate, thereby allowing it to be custom sized to an equally wide variety of exhaust silencing applications. This flexibility stems from the muffler's novel ability to be tuned, as to reactive sound attenuation, in three dimensions by varying the length, width and height of the chambers 40 and 42, and by varying the dimensions of the duct portions $44_a$, $46_a$ together with the sizes of the resonant attenuators 48 and 50. It should be specifically noted that each of the reactive attenuating chambers 40 and 42 extends axially beyond the opposite ends of its sound transmission inlet (i.e., the perforated duct portion $44_a$ or $46_a$ as the case may be). It is this "axial offset" feature of the chambers which allows them to be tuned in the axial dimension as well as in the two illustrated lateral dimensions.

By correlating the size relationships between and among the various sound attenuating components of the muffler 10 in a predetermined manner both the core and turbine noise components of a given turbine engine may be significantly diminished without appreciably impeding its exhaust gas flow.

In FIG. 5 an alternate embodiment 10$_a$ of the muffler 10 is illustrated, components similar to those in the muffler 10 being given the same reference numerals with the subscript "a". In such alternate embodiment, the low frequency sound attenuating characteristics of the muffler are improved by filling the chambers 40$_a$ and 42$_a$ (only a portion of chamber 40$_a$ being illustrated in FIG. 5) with a bulk sound-absorbing material 64.

In FIG. 6 a further alternate embodiment 10$_b$ of the muffler 10 is illustrated, components similar to those in the muffler 10 being given the same reference numerals with the subscript "b". In such further alternate embodiment both the high and low frequency sound attenuation characteristics of the muffler are improved by replacing the solid resonant attenuator covering walls 56 and 62 with perforated covering walls, perforated covering wall 66 being illustrated in FIG. 6 as an example of this modification.

From the foregoing it can be seen that the present invention provides an exhaust gas muffler which, because of its axial asymmetry and "laterally stacked" configuration, provides a unique degree of compactness while at the same time effectively attenuating both the core and turbine noise components of a gas turbine engine.

While the muffler 10 has been illustrated and described as having a rectangular cross-section, both the duct 12 and housing 30 could be of other cylindrical configurations. For example, if desired, both the duct and housing could be configured to have circular cross-sections, with the resonant attenuators 48 and 50 being appropriately curved along their lengths to correspond to the curved, perforated duct wall portions which they would cover.

The foregoing detailed description is to be clearly understood as given by way of illustration and example only, the spirit and scope of this invention being limited solely by the appended claims.

What is claimed is:

1. A compact muffler for attenuating gas turbine engine noise, comprising:
    (a) a housing having a rectangular cross-section which circumscribes an axis;
    (b) an exhaust duct having a rectangular cross-section and extending coaxially through the interior of said housing, said exhaust duct having four side walls, first and second ones of said side walls each having a perforated section;
    (c) a duality of baffle members extending between and intersecuring said housing and exhaust duct, and defining therewith first and second sound attenuating chambers each extending laterally around axial portions of at least two of said side walls, said first sound attenuating chamber communicating with the interior of said exhaust duct through a first portion of said perforated section of said first side wall, and said second sound attenuating chamber communicating with the interior of said exhaust duct through a first portion of said perforated section of said second side wall, each of said sound attenuating chambers extending axially beyond the portion of said perforated section through which it communicates with the interior of said exhaust duct;
    (d) a first latticed wall structure positioned within said first sound attenuating chamber and extending along a second portion of said perforated section of said first side wall, said first latticed wall structure defining a series of laterally extending sound attenuating cells each having an open laterally inner end communicating with the interior of said exhaust duct through a second portion of said perforated section of said first side wall, and a covered laterally outer end; and
    (e) a second latticed wall structure positioned within said second sound attenuating chamber and extending along a second portion of said perforated section of said second side wall, said second latticed wall structure defining a series of laterally extending sound attenuating cells each having an open laterally inner end communicating with the interior of said exhaust duct through a second portion of said perforated section of said second side wall, and a covered laterally outer end.

2. The compact muffler of claim 1 wherein said first and second side walls are opposite side walls.

3. The compact muffler of claim 1 wherein each of said first and second sound attenuating chambers has a generally L-shaped cross-section.

4. The compact muffler of claim 1 wherein said perforated sections have different axial lengths.

5. The compact muffler of claim 1 wherein said first and second latticed wall structures have different axial lengths.

6. The compact muffler of claim 1 wherein said first and second latticed wall structures have different lateral heights.

7. The compact muffler of claim 1 wherein said laterally outer ends of said sound attenuating cells are each covered with a perforated wall.

8. The compact muffler of claim 1 wherein said housing has a downstream end, and wherein said second portions of said perforated sections are positioned adjacent said downstream end.

9. The compact muffler of claim 1 wherein said first and second sound attenuating chambers are each filled with a bulk sound absorbing material.

10. The compact muffler of claim 1 wherein:
    (1) said first and second side walls are opposite side walls,
    (2) said first and second sound attenuating chambers have generally L-shaped cross-sections,
    (3) said perforated sections have different axial lengths,
    (4) said latticed wall structures have different axial lengths, and
    (5) said latticed wall structures have different lateral heights.

11. A compact muffler for attenuating gas turbine engine noise, comprising:
    (a) a housing extending along and circumscribing an axis;
    (b) an exhaust duct extending coaxially through the interior of said housing, said exhaust duct having first and second side wall portions each having a perforated section;
    (c) a duality of baffle members extending between and intersecuring said housing and exhaust duct, and defining therewith first and second sound attenuating chambers each extending laterally around an axial portion of one of said first and second side wall portions, said first sound attenuating chamber communicating with the interior of said exhaust duct through a first portion of said perforated section of said first side wall portion, and said second sound attenuating chamber communicating with the interior of said exhaust duct through a first portion of said perforated section of said second side wall portion, each of said sound attenuating chambers extending axially beyond the portion of said perforated section through which it communicates with the interior of said exhaust duct;

(d) a first latticed wall structure positioned within said first sound attenuating chamber and extending along a second portion of said perforated section of said first side wall portion, said first latticed wall structure defining a series of laterally extending sound attenuating cells each having an open laterally inner end communicating with the interior of said exhaust duct through a second portion of said perforated section of said first side wall portion, and a covered laterally outer end; and (e) a second latticed wall structure positioned within said second sound attenuating chamber and extending along a second portion of said perforated section of said second side wall portion, said second latticed wall structure defining a series of laterally extending sound attenuating cells each having an open laterally inner end communicating with the interior of said exhaust duct through a second portion of said perforated section of said second side wall portion, and a covered laterally outer end.

* * * * *